United States Patent [19]
Patyi et al.

[11] Patent Number: 5,632,239
[45] Date of Patent: May 27, 1997

[54] METHOD OF DISTRIBUTING AIR IN AN ENGINE INTAKE MANIFOLD

[75] Inventors: Michael P. Patyi; William E. Hughes, both of Troy; Mary T. Chappell, West Bloomfield; Frederick B. Hummer, Troy; Donald H. Kerska, Royal Oak, all of Mich.

[73] Assignee: Chrysler Corporation, Auburn Hills, Mich.

[21] Appl. No.: 639,045

[22] Filed: Apr. 16, 1996

[51] Int. Cl.$^6$ ........................................ F02M 35/10
[52] U.S. Cl. ........................ 123/184.36; 123/184.55
[58] Field of Search ........................ 123/184.55, 184.53, 123/184.54, 184.36

[56] References Cited

U.S. PATENT DOCUMENTS

| | | |
|---|---|---|
| 2,916,027 | 12/1959 | Chayne et al. . |
| 4,577,596 | 3/1986 | Senga . |
| 4,738,229 | 4/1988 | Wada et al. . |
| 4,763,612 | 8/1988 | Iwanami . |
| 4,766,853 | 8/1988 | Iwanami . |
| 4,809,647 | 3/1989 | Masumoto et al. . |
| 4,875,438 | 10/1989 | Suzuki et al. ........................ 123/184.55 |
| 4,957,071 | 9/1990 | Matsuo et al. . |
| 4,962,735 | 10/1990 | Andreas . |
| 5,000,129 | 3/1991 | Fukada et al. . |
| 5,080,051 | 1/1992 | Hitomi et al. . |
| 5,081,962 | 1/1992 | Kurokawa et al. ................ 123/184.53 |
| 5,109,811 | 5/1992 | Tanaka et al. . |
| 5,133,308 | 7/1992 | Hitomi et al. . |
| 5,156,117 | 10/1992 | Muller et al. ........................ 123/184.55 |
| 5,322,038 | 6/1994 | Urabe et al. . |
| 5,406,913 | 4/1995 | Rutschmann ........................ 123/184.36 |

FOREIGN PATENT DOCUMENTS

| | | |
|---|---|---|
| 51547A | 1/1993 | Japan . |
| 650228A | 2/1994 | Japan . |

*Primary Examiner*—Marguerite McMahon
*Attorney, Agent, or Firm*—Kenneth H. MacLean

[57] ABSTRACT

A three plenum air distribution manifold for intake air to an internal combustion engine with long runners leading from first and second spaced side plenums for delivery of air and recirculating exhaust gases into corresponding combustion chambers of the engine. The side plenums are connected at their outer extremities by an acoustically balanced cross over passage selectively closed by a manifold tuning valve (MTV) for improving engine output torque during low engine speed. A third plenum intermediate the two side plenums communicates directly with the combustion chambers through short runner passages opened and closed by valves (SRVs) for optimizing the output of engine torque during a higher range of engine speeds. The air flow through the manifold is controlled by an onboard electronic controller responsive to operating signals from the engine to change the characteristics of the manifold with different engine speeds.

2 Claims, 4 Drawing Sheets

METHOD OF DISTRIBUTING AIR IN AN ENGINE INTAKE MANIFOLD

FIELD OF THE INVENTION

This invention relates to the process of controlling air flow to an internal combustion engines and, more particularly, a multi-stage process of air flow through an intake manifold using a selectively openable manifold tuning valve and short runner valves thereby providing several selective modes of air flow operation.

BACKGROUND OF THE INVENTION

U.S. Pat. No. 5,000,129 to Fukada et al, issued Mar. 19, 1991, for "Intake System For Internal Combustion Engine" discloses an air intake system for a V-block engine having a central surge tank disposed above the space between the left and right cylinder banks of the engine. This surge tank is operatively integrated with left and right side surge tanks extending above respective banks of cylinders. A communicating passage disposed between discrete side intake passages connects the central surge tank with the left and right surge tanks so that all of the tanks combine to serve as a single surge tank having a large volume for the suppression of intake air interference.

U.S. Pat. No. 5,133,308, issued Jul. 28, 1992, to Hitomi et al for "Intake System For Engine" discloses an intake system for a V-block internal combustion engine having a centralized junction chamber and a plurality of discrete intake passages connecting the junction chamber with respective cylinders of the engine. Rotary valves in the intake passages are operated by actuators responding to a controller that receives engine speed signals to close and open the valves for improving engine torque.

In contrast to the relatively complex structures and processes for regulating air flow found in the above citations and many prior constructions, the present invention provides a straight forward three plenum active intake manifold for an internal combustion engine operative in several alternate modes to produce an improved engine torque curve over the entire range of engine speeds while reducing induction noise and variances in pitch.

SUMMARY OF THE INVENTION

In this invention an air flow process is provided using a three plenum active engine air intake manifold with dual zip tubes and an acoustic balancing cross over passage to provide improved acoustic tuning and engine performance. This is accomplished by integrating long runner and short runner intake systems of the manifold with active electronic controlled valve devices to optimize plenum tuning over the entire range of engine operating speeds. This invention provides improved engine torque throughout the speed range of the engine while simultaneously reducing induction noises and pitch variability.

The engine performance over a relatively high speed range, such as a wide open throttle condition, is enhanced by direct air flow form the central plenum into the engine ports. This is accomplished by opening the short runner valves (SRVs) by means of an electronic signal to a valve actuator. The resultant air flows directly from the intermediate plenum, through the short runner passageways, and into the engine intake ports to the combustion chambers. The air flow restriction is minimized during this higher engine speed.

Over a relatively low engine speed range, engine performance is improved and noise levels are decreased, particularly at idle. The air flows from the two side plenums which are spaced outwardly from one another to either side of the central plenum. The side plenums are connected to the engine intake ports by narrow, long runner passages. The resultant air flow velocity is enhanced at these lower engine speeds. The spaced side plenums are linked together at one end of the manifold by a cross over passage which provides acoustic balance under some engine operating conditions. The side plenums are also connected at an opposite end of the manifold by passages provided by zip tubes. Each zip tube extends form a central air inlet opening outward to a side plenum.

Air flow through the cross over passage is controlled by a selectively openable manifold tuning valve (MTV). In the preferred embodiment of this manifold, the MTV is closed during idle and over a lower range of engine speeds. The closed valve causes acoustic pressure waves generated in each of the side plenums to return to the interior of that plenum and constructively act upon the pulsed air flow therein caused by opening and closing of the engine intake valves. Resultantly, the air flow through the long runners is enhanced which improves volumetric efficiency and engine torque.

This manifold may be used to improve engine torque output for a variety of different internal combustion engines by tailoring the plenum volumes corresponding to engine size and desired operating speed. Engine performance, namely torque, can be improved by selective application any one of three possible intake manifold combinations as follows: operation with the MTV closed and the SRVs closed; operation with the MTV opened and the SRVs closed; and operation with the MTV closed and the SRVs opened.

Noise reduction benefits are also provided by this manifold. At idle and operation in a low engine speed range, the short runner valves are selectively closed to restrict air to flow solely through the outwardly spaced side plenums and then through the long runner passages. During engine operation in a higher range of engine speeds, the short runner valves are opened to allow air to also flow through a more direct route into the combustion chambers in addition to the previous long runner route.

A reduction in externally received noise is also provided by this manifold. At engine idle and operation over a relatively low speed range, selective closure of the short runner valves force air to flow only from the side plenums and through the narrow, long runner passages. To improve engine breathing over a higher range of engine speeds, such as at wide open throttle, the short runner valves are opened which allows air to flow in a more direct path to the combustion chambers as well as through the more indirect long runner passages. Resultantly, the flow restriction is greatly decreased to the benefit of engine performance.

Noise attenuation is augmented by the intersection of each zip tube with a side plenum and with the central air inlet to the manifold which aids in pressure wave cancellation by setting up opposite self-destructive pressure waves. The subject manifold allows for any remaining audible waves or noise exiting the throttle body to be easily reduced or canceled using simple and conventional passive wave attenuation devices positioned externally from the manifold. Also, with the wave cancellation provided by this manifold, there is a significant reduction in the back pressure in the induction system. This improves peak engine performance.

Another advantage of this manifold design is the space efficient packaging for under-hood engine placement due to the relative planar configuration of the plenums and runners. The resultant tight packaging permits a lower and more streamlined hood line. The manifold further provides improved access to spark plugs and fuel injectors (neither shown) which would be located below the plane of the manifold. Serviceability would be enhanced with the present design. The design can be used for a wide range of engines, particularly, 'V' type block engines, such as a 60 degree V-6 engine.

These and other objects, features, and advantages of the present invention will become more apparent from the following detailed description and drawings.

DESCRIPTION OF THE PREFERRED EMBODIMENT

Figure 1:
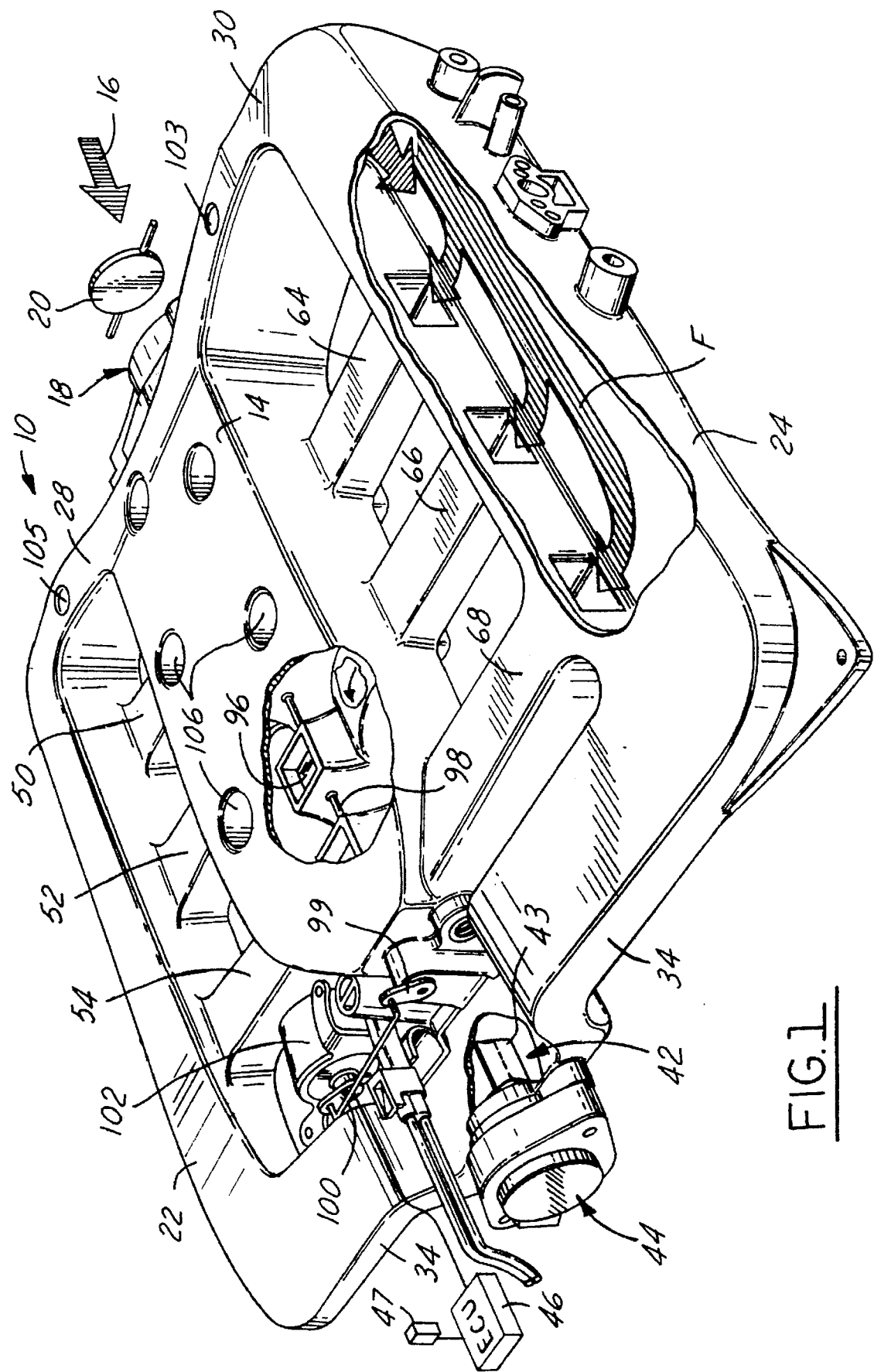
FIG. 1 is a perspective view of a preferred embodiment of the three plenum intake manifold showing flow control valves and associated control mechanisms to operate the valves and with portions broken away to reveal air flow paths therein.
Figure 2:
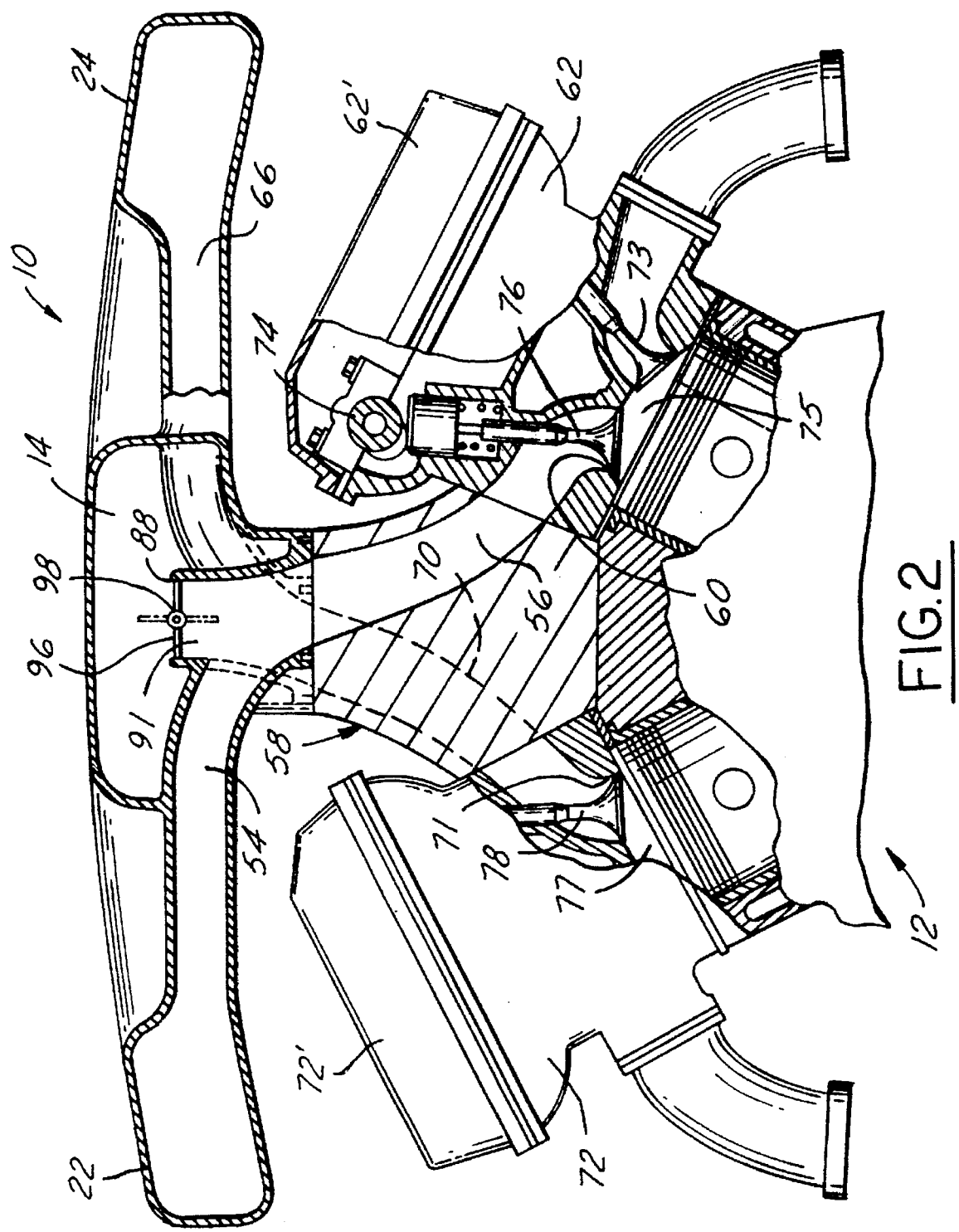
FIG. 2 is an end elevational view from the front portion of an associated engine of the subject manifold with partial sectioning to reveal passages therein and various engine parts.

Turning now to FIGS. 1 and 2, a three plenum air distributing manifold 10 for a V type six cylinder internal combustion engine 12 is shown. The manifold is fully active to provide multiple tuning peaks which peaks are effective at different engine speed ranges to optimize engine torque.

The manifold 10 has a centralized axially extending plenum 14 into which a flow of air 16 is feed through a throttle body 18. Throttle body 18 houses a conventional throttle plate 20 shown diagrammatically separated from the throttle body 18 but in reality is operatively mounted therein in a manner allowing it to be pivoted so as to control air flow into the manifold.

In addition to the centralized plenum 14, the manifold has a pair of side plenums 22 and 24 which are fluidly connected to the center plenum 14 and the inlet through the throttle body 18. More particularly, side plenums 22 and 24 are connected to one another at one end of the manifold adjacent the throttle body by transversely extending zip tubes 28 and 30. The two side plenums 22 and 24 are also connected to one another at an opposite end of the manifold by laterally extending crossover passage 34.

As best shown FIG. 1, flow through the cross over passage 34 is regulated by a manifold tuning valve (MTV) 42 which is mounted at a mid-position in crossover passage 34. The MTV 42 has a valve plate 43 which is selectively pivoted between opened and closed positions by an actuator. The actuator may be a piston which is powered by fluid pressure. In the preferred embodiment shown in FIG. 1, the actuator is in the form of an electric motor 44 selectively controlled by an electronic control unit (ECU) 46 which is part of the onboard engine control system of the vehicle. ECU 46 receives input signals from sensors, such as an engine speed or rpm sensor 47, to control operation of motor 44 as well as other motors or actuators which will be described hereafter.

As shown in FIG. 1, the left side plenum 22 is connected to the three cylinders in the right hand cylinder bank of the engine 12 by long runners 50, 52 and 54. Referring now to FIG. 2, one of the runners 54 is shown extending between plenum 22 and an intake passage 56 which is formed in a cylinder head manifold 58. The intake passage 56 extends to an intake port 60 of the cylinder head 62 to permit air to flow into one of the engine's combustion chambers 75.

Referring back to FIGS. 1 and 3, the right side plenum 24 is connected to the three cylinders of the left hand bank by long runners 64, 66 and 68. Specifically, one of the long runner passages 66 from plenum 24 is shown in FIG. 2. Air passes from plenum 24, through passage 66 to connect with passage 70 in the cylinder head manifold 58 and then to intake port 71 of the left cylinder head 72 and into combustion chamber 77.

Looking to FIG. 2, both right and left banks (sides) of the engine are similar. More particularly, the respective right and left cylinder heads 62, 72 support conventional camshafts which operate intake valves which in turn control air flow into the combustion chambers. The camshaft 74 of cylinder head 62 is operably connected to intake valve 76 and another camshaft (not visible) associated with cylinder head 72 is operably connected to intake valve 78. Intake valves 76, 78 are opened to control flow of air and fuel into respective combustion chambers 75 and 77. By closing the valves 76, 78, the combustion chambers are sealed during the combustion event.

Additionally, the cylinder heads 62, 72 support exhaust valves associated with each combustion chamber. For example, an exhaust valve 73 is shown associated with combustion chamber 75. Exhaust camshafts (not visible) are supported by cylinder heads 62, 72 to operate the exhaust valves. The cylinder heads 62, 72 support valve covers 62', 72' which extend over the camshafts.

Figure 3:
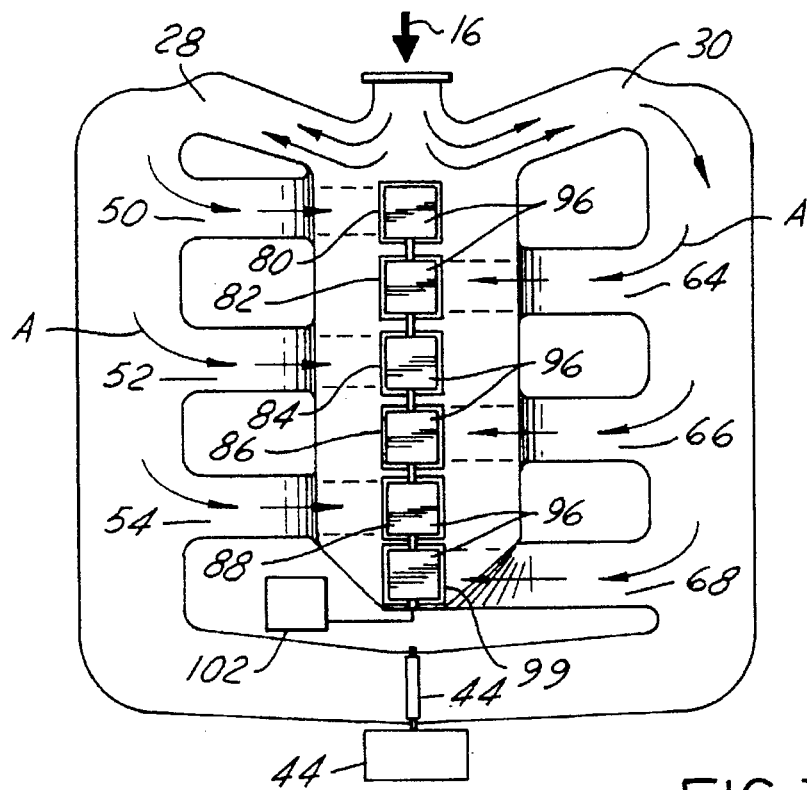
FIG. 3 is top planar view of the subject manifold shown somewhat schematically and broken away to illustrate air flow paths therethrough when in one mode of operation.
Figure 4:
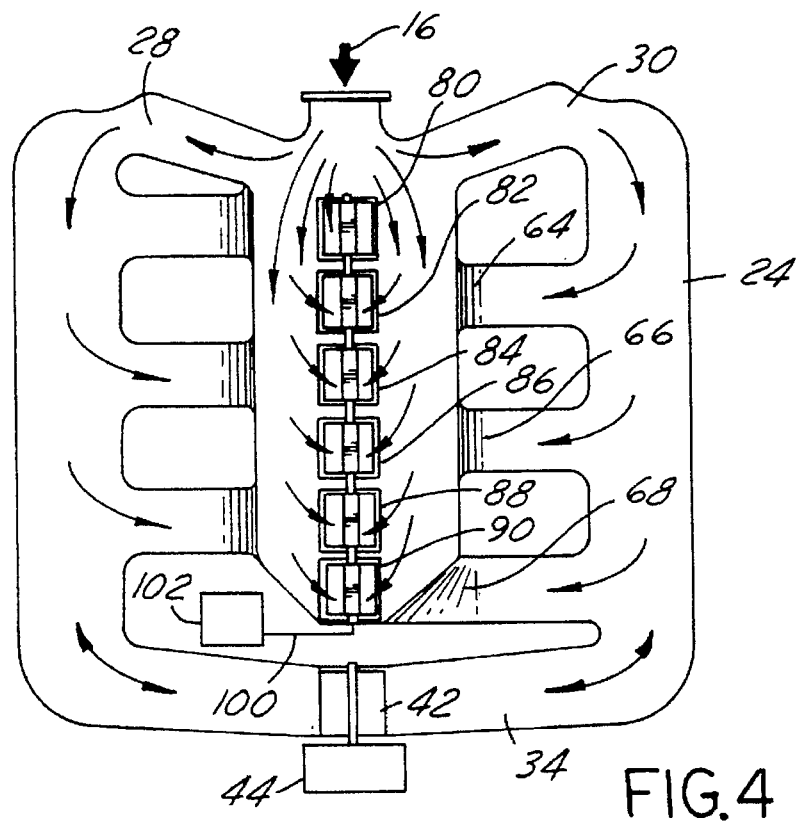
FIG. 4 is view similar to FIG. 3 but illustrating air flow paths through the subject manifold when in a second mode of operation.

Referring now to FIGS. 3 and 4, central plenum 14 is shown with six short runners 80, 82, 84, 86, 88 and 90. Each short runner is directly connected to the passages in cylinder head manifold 58 as best seen in FIG. 2 with relation to runner 88 and passage 56. Accordingly, short runners 80, 82, 84, 86, 88, and 90 directly feed air to a corresponding passages in manifold 58 from central plenum 14. Specifically, in FIG. 2, the passage 91 of short runner 88 connects plenum 14 to passage 56 to flow air through intake port 60 and into combustion chamber 75.

The air flow through each of the short runners is controlled by a short runner valve (SRV) 96 as best seen in FIGS. 3, 4 (closed and opened respectively). In FIG. 2, one of the short runner valves 96 is shown operatively mounted in one of the short runner passages 88 positioned upstream of its intersection with the passage 56 in cylinder head manifold 58. Each of the valves 96 are butterfly-type plate valves attached to a common shaft 98. Shaft 98 is supported for rotation by the manifold 10 and extends through the central plenum 14 at the entrance to the short runners 80-90. The shaft 98 can be rotated so that the valves 96 are moved to closed positions as seen in solid line in FIG. 1 and also in FIG. 3. In the closed position, air flow through the short runners 80-90 is blocked. Resultantly, air flow to the combustion chambers is through the throttle body 18; zip tubes 28, 30; left and right plenums 22, 24; long runners 80-90;

and connecting passages in the cylinder head manifold 58. This operative mode for the intake system is advantageous for idle and low speed operation of the engine.

As shown in FIG. 1, a crank arm 99 attached to the end of shaft 98 is engaged by a linkage 100 to operably connect the shaft 98 to a pneumatically powered motor 102. The pneumatic power to motor 102 is controlled by the ECU 46. Upon receiving an appropriate signal from a sensor or sensors, such as engine speed sensor 47, the ECU 46 directs power to the motor 102 for arranging the SRVs in their closed position for improved low speed operation and in their opened positions for improved high speed operation. More specifically, when the SRVs are closed, air flow into the short runner passages is blocked. This causes air to flow to the left side combustion chambers 77 through the long runners 64, 66, 68 from the right hand plenum 24. Similarly, air flow to the right side combustion chambers 75 is routed through the long runners 50, 52, 54 from the left side plenum 22. When high engine speeds are sensed by sensor 47, the signal to the ECU 46 activates motor 102 to open the SRVs. This improves air flow and increases engine performance by the addition of more direct flow paths to the combustion chambers.

Engine Performance with Subject Manifold

Figure 5:
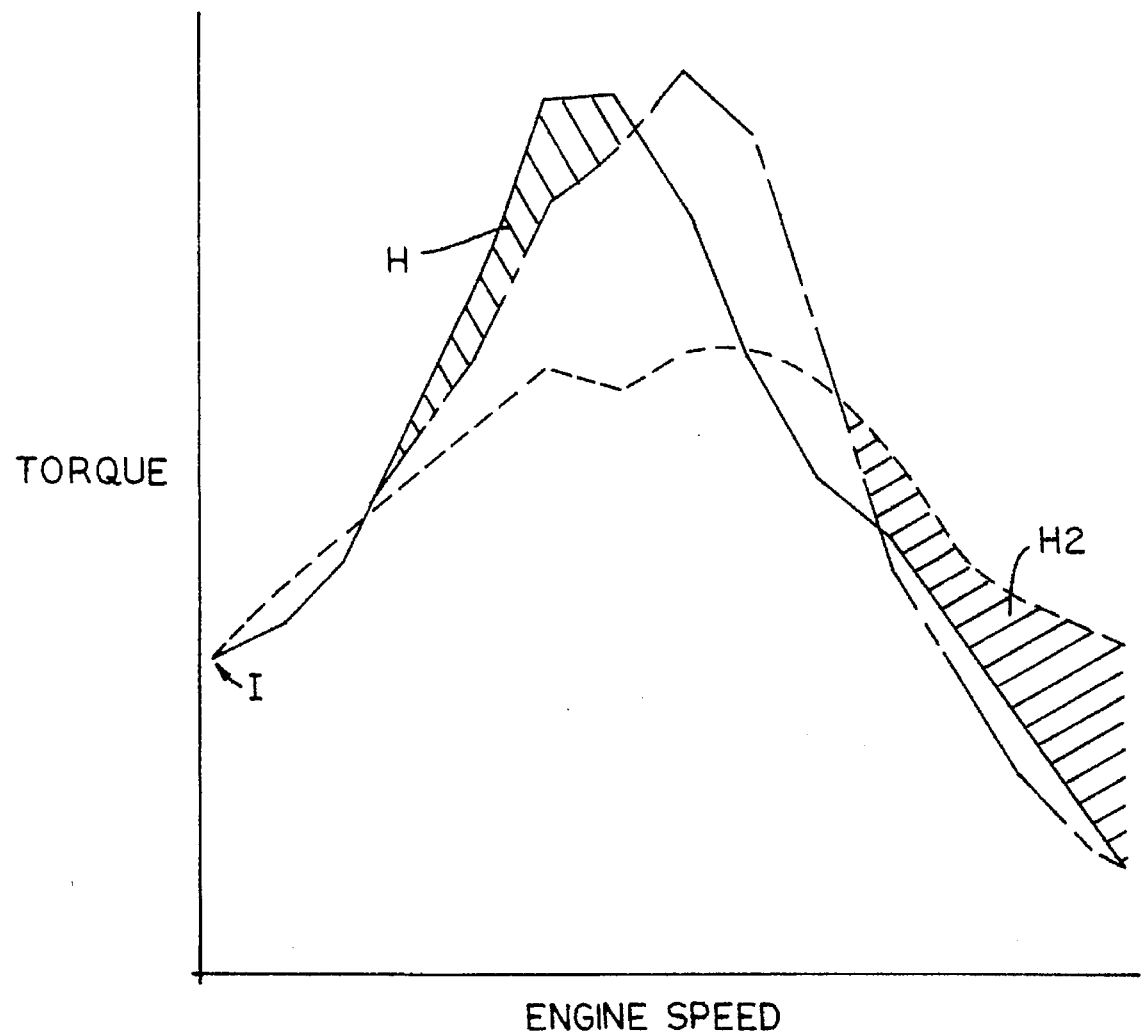
FIG. 5 is a graphical illustration which plots engine speed vs. engine torque for a particular engine having the subject manifold installed.

The subject manifold has been tested on a 3.2 L V-6 engine by Chrysler Corporation. In FIG. 5, engine performance (torque) is plotted according to engine speed. The curve P1 shows the performance with the MTV and SRVs closed. The curve P2 shows the performance with the MTV opened and the SRVs closed. The curve P3 shows the performance with the MTV closed and the SRVs opened. Under an engine idle condition represented by point I in FIG. 5, the ECU 46 directs motor 44 of the manifold tuning valve (MTV) 42 to position the MTV plate 43 to a fully closed position in the crossover passage 34 (see FIG. 1). Also, the ECU 46 controls actuation of motor 102 so as to maintain the SRVs in closed positions. Accordingly, cross over passage is blocked. With the MTV closed, pressure waves formed in the side plenums are not balanced acoustically by passage through the cross over. However, wave forms in the side plenums 22, 24 act independently to produce desirable enhanced air flows as more specifically described below.

During an engine idle condition, the valves of both the MTV and the SRV systems are closed as shown in FIGS. 1 and 3. Air for the engine enters the manifold through the throttle body and its flow volume is controlled by the positioning of the throttle valve plate 20 by the vehicle operator through the vehicle's accelerator pedal. Because the SRVs are closed, air flows from the throttle body to the combustion chambers through the zip tubes 28 and 30, into the two side plenums 22 and 24, and then through long runner passages 50, 52, 54 or 64, 66 and 68 to corresponding continuing passages in the air distribution manifold 58 to the intake ports formed in the two cylinder heads 62, 72 of the engine. When desired, small volumes of exhaust gas is added to the air flow (or recirculated) through intake ports 103 and 105 formed in the zip tubes 28 and 30. Whenever an engine intake valve is opened, air and any recirculated exhaust flows into an associated combustion chamber.

With the cross over passage 34 blocked by a closed valve plate 42 as shown in FIG. 1 and 3, pressure waves are generated in both side plenums 22, 24. These wave forms are normally of about the same frequency and amplitude in either plenum. The waves rebound from the closed cross over valve to cause increases in air density which enhance air flow into the long runners 50, 52, 54 and 64, 66, 68 at lower engine speeds of below 3600 rpm, for example. The air flow into the long runners is represented by flow arrows A in FIG. 3. As seen in FIG. 5, during an intermediate engine speed, the engine torque is significantly increased by maintaining the MTV and SRV systems closed as the air flow through the long runners is enhanced. This increase is represented by hatched area H in FIG. 5.

At higher intermediate engine speeds, for example of over about 3600 rpm, a torque benefit can be obtained by opening valve 43 of the MTV system while the SRVs 96 are maintained in closed positions. During a higher engine speed range, for example of over about 5000 rpm, the torque characteristics of the engine benefit by closing the MTV valve 43 and opening the SRVs 96. With SRVs 96 opened, air still can flow through the long runners but an additional and more direct path is opened extending from the central plenum 14 directly into the short runners as identified by flow arrows F in FIG. 4. By adding flow paths through the short runners, the total manifold tuning characteristic is changed resulting in a much greater air flow capacity. The resultant increase in air flow capacity generates increased torque over the higher speed range. In FIG. 5, the increased torque is represented by the hatched area H2.

While benefits of both the MTV and SRV systems are described and shown as occurring during certain engine speed ranges, there are other ranges and conditions which can benefit from differing intake manifold and valving configurations and combinations. Accordingly, for different internal combustion engine configurations and for different engine speed ranges, the subject intake manifold system can take different tuning characteristics to provide desired torque benefits derived from different SRV and MTV valving operations. Resultantly, by varying operation of the MTV and SRV systems, engine torque can be optimized for a number of different engines operating over a wide range of speeds.

In addition to the enhanced torque characteristics previously explained, a valuable contribution of this manifold with the MTV and SRV systems is an opportunity to decrease induction noise of the engine. It is particularly desirable to reduce noise during engine idle and during a lower speed range of engine operation. Under these conditions, the escape of pressure waves from the side plenums 22, 24 to the atmosphere through the throttle body is greatly inhibited by the geometry of the manifold. The multiple turns in the path between the interiors of plenums 22, 24 to the zip tubes 28, 30 and from the zip tubes into the throttle body air inlet passage help to decrease emission of noise through the throttle body and out to the atmosphere. The intersection of the zip tubes 28, 30 at a substantially right angle to the throttle body aids in cancellation of some pressure waves generated in the side plenums 22, 24. When pressure waves interact together at the point of intersection adjacent the throttle body, cancellation occurs. Resultantly, noise emission is decreased. Any small volumes of noise exiting the throttle body are easily canceled using simple conventionally passive devices. With the aforedescribed noise cancellation effects, back pressure of the induction system is reduced and engine performance and fuel economy are enhanced.

Also, with the subject manifold system, under hood packaging is improved so that additional hood streamlining is possible. Specifically, the subject manifold provides a compact and low profile engine package created because the basic configuration and size of each runner and each plenum is essentially in a common plane and is elongated in a generally horizontal plane. Note in FIG. 1 that this manifold has shallow openings 106 for receiving fasteners (not shown) to attach the manifold to the air distribution manifold 58. Also, access to fuel injectors (not shown) through the spaces between long runners 50-54 and 64-68 located outward from the central plenum 14.

While a preferred embodiment of the invention has been shown and described, other embodiments will now become apparent to those skilled in the art. Accordingly, this invention is not to be limited to that which is shown and described but by the following claims.

What is claimed is:

1. A method of distributing air to the combustion chambers of an internal combustion engine through a multi-plenum air intake manifold having an air intake and a pair of laterally spaced side plenums connected to one another by an acoustic balancing crossover passage and having a centralized plenum disposed between the side plenums operatively connected to the respective combustion chambers by short runners, said side plenums being connected to the combustion chamber by long runners, said short runners also being connected to the combustion chambers upstream and in series with said long runners comprising the steps of:

a. closing said short runners so that intake air is routed to said combustion chambers through said side plenums and said long runners, b. closing said acoustic balancing crossover passage so that pressure waves in said side chambers constructively interfere in superposition to effect increased air flow through said long runners for increasing engine torque from idle to a mid-speed range of said engine, c. subsequently opening said short runner valves so that air flow to said combustion chambers flows primarily through said short runners that provide an increased flow capacity through said manifold to improve combustion in said combustion chambers so that said engine torque is further increased for a higher range of engine speeds.

2. A method of distributing air to the combustion chambers of an internal combustion engine through a multi-plenum air intake manifold having an air intake and a pair of laterally spaced side plenums connected to one another by an acoustic balancing cross over passage and having a centralized plenum disposed between the side plenums operatively connected to the respective combustion chambers by short runners, said side plenums being connected to the combustion chamber by long runners, said short runners also being connected to the combustion chambers upstream and in series with said long runners comprising the steps of:

a. closing said short runners so that intake air is routed to said combustion chambers through said side plenums and said long runners, b. blocking said acoustic balancing cross over passage for improving torque for a first range of engine speeds so that pressure waves in said side chambers constructively interfere in superposition to effect increased air flow through said long runners for increasing engine torque from idle to a mid speed range of said engine, c. subsequently opening said acoustically balancing crossover passage and said short runner valves so that air flow to said combustion chambers is primarily through said short runner valves that provide an increased flow capacity through said manifold to improve combustion in said combustion chambers so that said engine torque is further increased for a higher range of engine speeds.

* * * * *